United States Patent
Tomasi et al.

(10) Patent No.: US 10,924,251 B2
(45) Date of Patent: Feb. 16, 2021

(54) ENCODING DEVICE AND METHOD AND CORRESPONDING DECODING DEVICE AND METHOD

(71) Applicant: Huawei Technologies Co., Ltd., Shenzhen (CN)

(72) Inventors: Beatrice Tomasi, Munich (DE); Frederic Gabry, Munich (DE); Valerio Bioglio, Boulogne Billancourt (FR); Ingmar Land, Boulogne Billancourt (FR); Jean-Claude Belfiore, Boulogne Billancourt (FR); Gaoning He, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 16/259,722

(22) Filed: Jan. 28, 2019

(65) Prior Publication Data

US 2019/0173657 A1    Jun. 6, 2019

Related U.S. Application Data

(63) Continuation of application No. PCT/EP2016/068257, filed on Jul. 29, 2016.

(51) Int. Cl.
*H04L 5/02* (2006.01)
*H04L 1/00* (2006.01)
(Continued)

(52) U.S. Cl.
CPC .............. *H04L 5/026* (2013.01); *G06F 30/20* (2020.01); *H03M 13/251* (2013.01);
(Continued)

(58) Field of Classification Search
None
See application file for complete search history.

(56) References Cited

U.S. PATENT DOCUMENTS 6,272,123 B1 * 8/2001 Abe ....................... H04J 13/00
                                                        370/342
6,735,734 B1 * 5/2004 Liebetreu .............. H04L 1/0041
                                                        714/775
(Continued)

FOREIGN PATENT DOCUMENTS

CN          101960766 A      1/2011
CN          102057579 A      5/2011
(Continued)

OTHER PUBLICATIONS

Yu Yi et al., "Design of semi-algebraic low-density parity-check (SA-LDPC) codes for multilevel coded modulation," Proceedings of the Fourth International Conference on Parallel and Distributed Computing, Applications and Technologies, pp. 1-4, XP010661473, Institute of Electrical and Electronics Engineers—New York, New York (Aug. 29-29, 2003).
(Continued)

*Primary Examiner* — Ayaz R Sheikh
*Assistant Examiner* — Tarell A Hampton
(74) *Attorney, Agent, or Firm* — Leydig, Voit & Mayer, Ltd.

(57) ABSTRACT

Encoding of information bit sequences by use of an encoding device having more than two encoding entities is provided. Decoding of output codewords by a decoding device having more than two decoding entities is further provided. The encoding and the decoding are implemented through transmitting output codewords, generated by the encoding
(Continued)

device, to the decoding device via a channel, wherein two or more user devices transmit the respective output codewords concurrently via the channel.

19 Claims, 9 Drawing Sheets

(51) Int. Cl.
*H03M 13/35* (2006.01)
*H03M 13/25* (2006.01)
*G06F 30/20* (2020.01)
*H04L 1/16* (2006.01)
*G06F 111/08* (2020.01)

(52) U.S. Cl.
CPC .......... *H03M 13/353* (2013.01); *H04L 1/004* (2013.01); *H04L 1/0009* (2013.01); *H04L 1/0047* (2013.01); *H04L 1/1614* (2013.01); *G06F 2111/08* (2020.01)

(56) References Cited

U.S. PATENT DOCUMENTS

| | | | | |
|---|---|---|---|---|
| 7,536,198 | B1* | 5/2009 | Wu | H04B 7/0669 370/335 |
| 2003/0072283 | A1* | 4/2003 | Varshney | H04B 7/2618 370/335 |
| 2003/0128674 | A1* | 7/2003 | Kong | H04L 1/08 370/320 |
| 2004/0071158 | A1* | 4/2004 | Wei | H04L 5/06 370/464 |
| 2005/0220200 | A1* | 10/2005 | Giannakis | H04L 5/023 375/260 |
| 2006/0023717 | A1* | 2/2006 | Trachtman | H04L 1/0083 370/392 |
| 2006/0029124 | A1* | 2/2006 | Grant | H04B 1/71057 375/148 |
| 2007/0217355 | A1* | 9/2007 | de La Chapelle | H04L 1/0002 370/328 |
| 2009/0241008 | A1* | 9/2009 | Kim | G06F 11/1072 714/755 |
| 2010/0128765 | A1* | 5/2010 | Schober | H04L 1/005 375/220 |
| 2010/0138575 | A1* | 6/2010 | Noyes | G06F 13/28 710/110 |
| 2010/0332939 | A1 | 12/2010 | Shimanuki | |
| 2011/0107187 | A1* | 5/2011 | Gill | H03M 13/27 714/771 |
| 2015/0078486 | A1 | 3/2015 | Wang et al. | |
| 2015/0091742 | A1 | 4/2015 | Ionita et al. | |
| 2015/0327274 | A1* | 11/2015 | Lim | H04W 72/0466 370/315 |
| 2016/0028417 | A1 | 1/2016 | Yu et al. | |
| 2016/0049999 | A1* | 2/2016 | Taherzadeh Boroujeni | H04L 27/2634 370/335 |
| 2016/0050039 | A1* | 2/2016 | Ma | H04L 27/3416 370/329 |
| 2016/0088646 | A1* | 3/2016 | Sun | H04L 1/0028 370/329 |
| 2016/0330265 | A1* | 11/2016 | Abdoli | H04L 5/0021 |
| 2017/0064645 | A1* | 3/2017 | Taherzadeh Boroujeni | H04W 52/286 |
| 2017/0099098 | A1* | 4/2017 | Lin | H04B 7/26 |
| 2017/0104495 | A1 | 4/2017 | Murakami et al. | |
| 2017/0117986 | A1* | 4/2017 | Perotti | H04L 1/005 |
| 2017/0127423 | A1* | 5/2017 | Boroujeni | H04L 1/00 |
| 2017/0295500 | A1* | 10/2017 | Sun | H04L 25/03987 |
| 2017/0331589 | A1* | 11/2017 | Jang | H04L 27/34 |
| 2018/0013525 | A1* | 1/2018 | Baligh | H04L 5/0021 |
| 2018/0124684 | A1* | 5/2018 | Kwon | H04W 48/10 |
| 2018/0131433 | A1* | 5/2018 | Kang | H04L 1/00 |
| 2019/0007092 | A1* | 1/2019 | Bayesteh | H04L 1/00 |
| 2019/0020388 | A1* | 1/2019 | Lee | H04L 1/1893 |
| 2019/0044571 | A1* | 2/2019 | Taherzadeh Boroujeni | H04B 1/707 |
| 2019/0141750 | A1* | 5/2019 | Lee | H04W 74/0816 |
| 2019/0165972 | A1* | 5/2019 | Lee | H04L 25/03942 |
| 2019/0173556 | A1* | 6/2019 | Zhou | H04B 7/0669 |
| 2019/0305877 | A1* | 10/2019 | Lee | H04L 1/0004 |

FOREIGN PATENT DOCUMENTS

| | | |
|---|---|---|
| CN | 103503319 A | 1/2014 |
| JP | 5215311 B2 | 6/2013 |
| WO | 2014144758 A1 | 9/2014 |
| WO | 2016023517 A1 | 2/2016 |

OTHER PUBLICATIONS

Abotabl et al., "Multi-level coding and multi-stage decoding in MAC, broadcast and relay channel," 2014 IEEE International Symposium on Information Theory, pp. 1-6, XP032635047, Institute of Electrical and Electronics Engineers—New York, New York (2014).
Saito et al., "Non-Orthogonal Multiple Access (NOMA) for Cellular Future Radio Access," 2013 IEEE 77th Vehicular Technology Conference (VTC Spring), pp. 1-6, XP032547855, Institute of Electrical and Electronics Engineers—New York, New York (Jun. 2-5, 2013).
Wachsmann et al., "Multilevel Codes: Theoretical Concepts and Practical Design Rules," IEEE Transactions on Information Theory (vol. 45, Issue: 5, Jul. 1999, pp. 1361-1391, XP011027411, Institute of Electrical and Electronics Engineers—New York, New York (1999).
Seidl et al., "Polar-Coded Modulation," in IEEE Transactions on Communications, vol. 61, No. 10, pp. 1-11, Institute of Electrical and Electronics Engineers—New York, New York (Oct. 2013).
CISCO, "VNI Global Fixed and Mobile Internet Traffic Forecasts",Retrived from Internet :http://www.cisco.com/c/en/us/solutions/service-provider/visual-networking-index-vni/index.html, pp. 1-4 (Mar. 19, 2019).
TSE, "Fundamentals of Wireless Communication," Cambridge, U.K: Cambridge Univ. Press, Ch. 6., pp. 1-647 (2005).
Liu et al., "On the Capacity Comparison between MIMO-NOMA and MIMO-OMA," in IEEE Access, vol. 4, pp. 2123-2129, Institute of Electrical and Electronics Engineers—New York, New York (2016).
Nikopour et al., "Sparse Code Multiple Access," in Proceedings of IEEE 24th International Symposium on Personal Indoor and Mobile Radio Communications (PIMRC), pp. 332-336, Institute of Electrical and Electronics Engineers—New York, New York (2013).
Ungerboeck, "Channel Coding with Multilevel/phase Signals," in IEEE Transactions on Information Theory, vol. 28, No. 1, pp. 55-67, Institute of Electrical and Electronics Engineers—New York, New York (Jan. 1982).
E. Arikan, "Channel Polarization: A Method for Constructing Capacity-Achieving Codes for Symmetric Binary-Input Memoryless Channels," in IEEE Transactions on Information Theory, vol. 55, No. 7, pp. 3051-3073 (Jul. 2009).

* cited by examiner

ENCODING DEVICE AND METHOD AND CORRESPONDING DECODING DEVICE AND METHOD

CROSS-REFERENCE TO RELATED APPLICATIONS

This application is a continuation of International Application No. PCT/EP2016/068257, filed on Jul. 29, 2016, the disclosure of which is hereby incorporated by reference in its entirety.

TECHNICAL FIELD

Embodiments of the present invention are directed to an encoding device and method and to a corresponding decoding device and method. Further, embodiments of the present invention relate to a correspondingly arranged computer program products.

BACKGROUND

Data traffic in the area of wireless communication is increasing rapidly. Such increase of data traffic demand calls for new techniques to improve spectral efficiency of the current wireless communication schemes. Therefore, the next generation of cellular networks also needs to provide wireless communication services to an increased number of devices requesting data rates from low to high.

Therefore, still a need exists for approaches that improve the handling of heavy data traffic in a communication system. In particular, approaches are desired that improve the spectral efficiency in a communication system and that support different data rates used for transmitting data in the communication system.

SUMMARY

Embodiments of the present invention provide methods and devices that improve the handling of heavy data traffic in a communication system.

Embodiments provide an encoding device, a decoding device and corresponding methods, arrangements, or configurations of which help and support the handling of heavy data traffic in a communication system. The communication system is, for example, a wireless communication system. In particular, the encoding and the decoding are executed in view of the fact that output codewords, generated by the encoding device, are transmitted to the decoding device via a channel, via which two or more user devices transmit the respective output codewords concurrently. The user devices are communication devices that are capable of transmitting and receiving data via a communication network such as a wireless communication network.

Embodiments of the present invention are provided in the following description, and the appended figures by way of example.

According to a first aspect of embodiments of the invention, an encoding device is provided, which is arranged for encoding an information bit sequence, wherein the encoding device comprises: a sequence partitioning entity configured to divide the information bit sequence into L information bit sub-sequences, wherein L is an integer greater than or equal to two; an encoding entity set, wherein: the encoding entity set comprises L encoding entities; each encoding entity of the encoding entity set is configured to generate a respective encoded sub-sequence by encoding one information bit sub-sequence of the L information bit sub-sequences; and each encoding entity of the encoding entity set is configured to encode the respective information bit sub-sequence by use of a respective code rate, wherein the code rate is determined for transmission via a channel, via which more than two devices execute transmissions concurrently; the encoding device further comprising a bitmapping entity configured to generate a codeword by mapping one or more encoded bits of each of the encoded sub-sequences to a codeword symbol; and a codeword processing entity configured to generate an output codeword by processing the codeword for a non-orthogonal multiple access.

In a first implementation form of the encoding device according to the first aspect, the codeword processing entity is configured to process the codeword according to a non-orthogonal multiple access scheme.

In a second implementation form of the encoding device according to the first aspect or according to the first implementation form, the encoding device is configured to transmit the output codeword to a further device via the channel, and wherein more than two devices transmit respective output codewords via the channel concurrently.

In a third implementation form of the encoding device according to the first aspect or according to the first or second implementation form, each encoding entity of the encoding entity set is configured to encode an information bit sub-sequence that has a predetermined length.

In a fourth implementation form of the encoding device according to the first aspect or according to the first, second, or third implementation form, the sequence partitioning entity is configured to divide the information bit sequence such that each information bit sub-sequence has a respective predetermined length.

In a fifth implementation form of the encoding device according to the first aspect or according to the first, second, third, or fourth implementation form, two or more encoding entities of the encoding entity set use different code rates.

In a sixth implementation form of the encoding device according to the first aspect or according to the first, second, third, fourth, or fifth implementation form, the encoding device comprises further a code rate determining entity configured to determine, for each encoding entity of the encoding entity set, a respective code rate to be used by the respective encoding entity.

In a seventh implementation form of the encoding device according to the sixth implementation form, the code rate determining entity is configured to: determine, for each encoding entity, a respective code rate to be used by the corresponding encoding entity for encoding; compute, for each encoding entity, error rates of encoded sub-sequences, encoded by the corresponding encoding entity; and adjust, for each encoding entity, the code rate by use of the error rates.

In an eighth implementation form of the encoding device according to the seventh implementation form, the code rate determining entity is configured to compute, for each encoding entity, error rates by use of Monte-Carlo simulations.

In a ninth implementation form of the encoding device according to the seventh or eighth implementation form, the code rate determining entity is configured to adjust, for each encoding entity, the code rate by use of the error rates by: computing an average error rate from the error rates of encoded sub-sequences, encoded by the corresponding encoding entity; and if the average error rate is greater than a maximum error rate, adjusting the code rate.

In a tenth implementation form of the encoding device according to the ninth implementation form, if the average error rate is greater than the maximum error rate, the code rate determining unit is configured to adjust the code rate by reducing the code rate.

In an eleventh implementation form of the encoding device according to the ninth or tenth implementation form, if the average error rate is greater than the maximum error rate, the code rate determining unit is configured to reduce the code rates of the further encoding entities of the encoding entity set.

In a twelfth implementation form of the encoding device according to any one of the sixth to eleventh implementation forms, the code rate determining entity is configured to operate offline.

In a thirteenth implementation form of the encoding device according to first aspect or according to any one of its first to twelfth implementation forms, the encoded sub-sequences have the same length.

According to a second aspect of embodiments of the invention, an encoding method is provided, which is arranged for encoding an information bit sequence, wherein the method comprises the following steps: dividing, by a sequence partitioning entity, the information bit into L information bit sub-sequences, wherein L is an integer greater than or equal to two; encoding the L information bit sub-sequences by an encoding entity set, wherein: the encoding entity set comprises L encoding entities; by each encoding entity of the encoding entity set of the encoding entity set, a respective encoded sub-sequence is generated by encoding one information bit sub-sequence of the L sub-sequences; and each encoding entity of the encoding entity set is configured to encode the respective information bit sub-sequence by use of a respective code rate, wherein the code rate is determined for transmission via a channel, via which more than two devices execute transmissions concurrently; wherein the method further comprises: generating, by a bitmapping entity, a codeword by mapping one or more encoded bits of each of the encoded sub-sequences to a codeword symbol; and generating, by a codeword processing entity, an output codeword by processing the codeword for a non-orthogonal multiple access. Generally, the steps of the encoding method correspond to the steps or activities executed by the encoding device as introduced above and as described in more detail below.

A third aspect of embodiments of the invention relate to a computer program product comprising computer readable program code that is configured to cause a computing device to execute steps of the encoding method introduced above and explained in more detail below. Embodiments of the invention also provide a computer-readable recording medium configured to store therein said computer program product.

According to a fourth aspect of embodiments of the invention, a decoding device is provided, which is arranged to decode output codewords received from two or more user devices via the same channel, wherein each user device of the two or more user devices transmits respective output codewords via the channel concurrently, wherein the decoding device comprises: a multi-user detecting entity set, wherein the multi-user detecting entity set comprises L multi-user detecting entities, wherein L is an integer greater than or equal to two; a decoding entity set, wherein the decoding entity set comprises L decoding entities; and an encoding entity set; wherein: the decoding device is a multi-level decoding device comprising L levels; each level of the decoding device comprises one multi-user detecting entity of the multi-user detecting entity set and one decoding entity of the decoding entity set; between two levels of the decoding device an encoding entity of the encoding entity set is located; each multi-user detecting entity of the multi-user detecting entity set is configured, for each user device of two or more user devices, concurrently transmitting the respective output codewords via the channel, to: detect an encoded bit sequence from an output codeword transmitted from the respective user device via the channel; for each i-th bit of each of symbols of the output codeword, determine a log likelihood ratio and add the log likelihood ratio of the respective i-th bit to a log likelihood ratio set, wherein i corresponds the level, in which the multi-user detecting entity is located; and provide the encoded bit sequence and the log likelihood ratio set to a decoding entity of the decoding entity set, which is in the same level as the multi-user detecting entity; wherein each decoding entity of the decoding entity set is configured to generate, for each user device of two or more user devices, a decoded information bit sequence by decoding the encoded bit sequence of the respective user device, wherein in said decoding the log likelihood ratio set is used; and each encoding entity of the encoding entity set is configured, for each user device of the two or more user devices, to: receive from a decoding entity of the decoding entity set the decoded information bit sequence of the respective user device; generate an encoded information bit sequence from the decoded information bit sequence; and provide the encoded information bit sequence to a multi-user detecting entity of the multi-user detecting entity set, wherein the level of the multi-user detecting entity is a subsequent level of the level of the decoding entity.

Further, according to a fifth aspect of the embodiments of the invention, a decoding method is provided, which decodes output codewords received from two or more user devices via the same channel, wherein each user device of the two or more user devices transmits respective output codewords via the channel concurrently, wherein the decoding method comprises operating a decoding device which comprises: a multi-user detecting entity set, wherein the multi-user detecting entity set comprises L multi-user detecting entities, wherein L is an integer greater than or equal to two; a decoding entity set, wherein the decoding entity set comprises L decoding entities; and an encoding entity set; wherein: the decoding device is a multi-level decoding device comprising L levels; each level of the decoding device comprises one multi-user detecting entity of the multi-user detecting entity set and one decoding entity of the decoding entity set; between two levels of the decoding device an encoding entity of the encoding entity set is located; each multi-user detecting entity of the multi-user detecting entity set executes, for each user device of two or more user devices, concurrently transmitting the respective output codewords via the channel, the following: detects an encoded bit sequence from an output codeword transmitted from the respective user device via the channel; for each i-th bit of each of symbols of the output codeword, determines a log likelihood ratio and add the log likelihood ratio of the respective i-th bit to a log likelihood ratio set, wherein i corresponds the level, in which the multi-user detecting entity is located; and provides the encoded bit sequence and the log likelihood ratio set to a decoding entity of the decoding entity set, which is in the same level as the multi-user detecting entity; wherein each decoding entity of the decoding entity set generates, for each user device of two or more user devices, a decoded information bit sequence by decoding the encoded bit sequence of the respective user device, wherein in said decoding the log likelihood ratio set is used; and each encoding entity of the encoding entity set executes, for each user device of the two or more user devices, the following: receives from a decoding entity of the decoding entity set the decoded information bit sequence of the respective user device; generates an encoded information bit sequence from the decoded information bit sequence; and provides the encoded information bit sequence to a multi-user detecting entity of the multi-user detecting entity set, wherein the level of the multi-user detecting entity is a subsequent level of the level of the decoding entity. Generally, the steps of the method correspond to the steps or activities executed by the decoding device as introduced above and as described in more detail below.

Further, embodiments of the present invention relate to a computer program product comprising computer readable program code that is configured to cause a computing device to execute steps of the decoding method introduced above and explained in more detail below. Embodiments of the invention further proposes a computer-readable recording medium configured to store therein said computer program product.

Consequently, embodiments of the present invention are directed in general to encoding of information bit sequences by use of an encoding device having more than two encoding entities and to decoding of output codewords by a decoding device having more than two decoding entities. The encoding and the decoding are executed in view of the fact that output codewords, generated by the encoding device, are transmitted to the decoding device via a channel, via which two or more user devices transmit the respective output codewords concurrently.

By use of embodiments of the present invention as specified above and as described in more detail below, an improved handling of heavy data traffic is enabled. The data is encoded such that the output codewords can be transmitted via a channel, via which more than two user devices transmit output codewords concurrently. Further, different data rates are supported by embodiments of the present invention. Additionally, spectral efficiency is supported by embodiments of the present invention. Moreover, occurrence of errors in the transmitted data is reduced, although output codewords are transmitted via a channel used concurrently by more than two user devices.

BRIEF DESCRIPTION OF THE DRAWINGS

The above-described aspects and implementation forms of embodiments of the present invention will be explained in the following description of specific embodiments in relation to the enclosed drawings, in which.

DETAILED DESCRIPTION OF THE EMBODIMENTS

Generally, it has to be noted that all arrangements, devices, modules, components, models, elements, units, entities, and means and so forth described in the present application can be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method of embodiments of the present invention and its various steps are embodied in the functionalities of the various described apparatus elements. Moreover, any of the embodiments and features of any of the embodiments, described herein, may be combined with each other, unless a combination is explicitly excluded.

Figure 1:
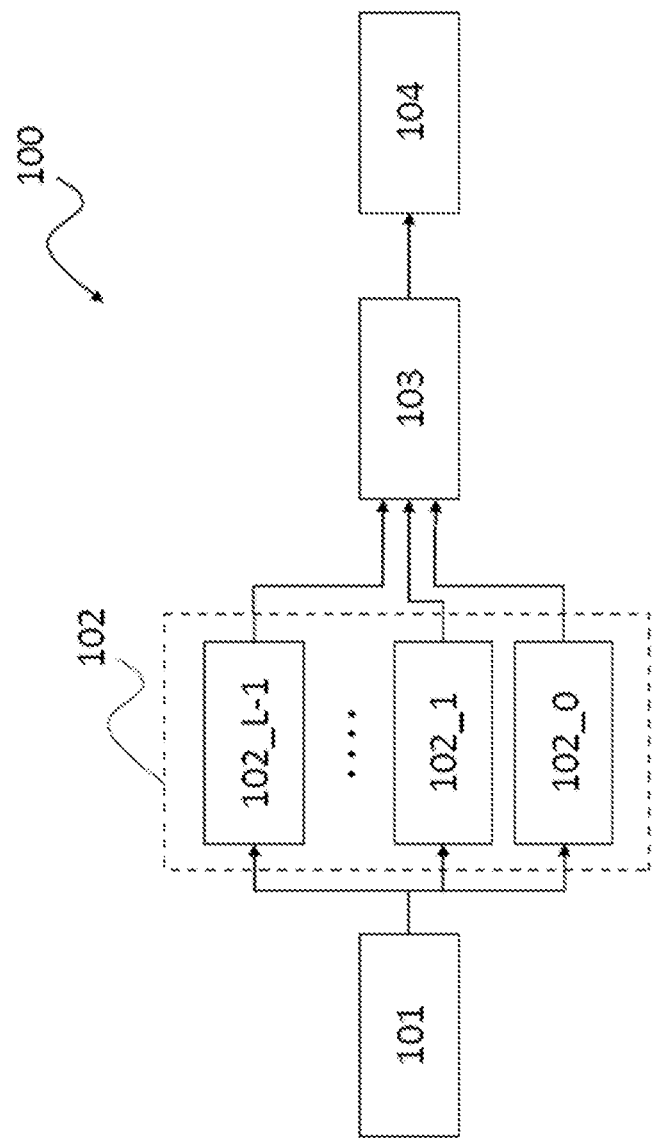
FIG. 1 shows an exemplary arrangement of an encoding device according to an embodiment of the present invention.

FIG. 1 shows an exemplary arrangement of an encoding device 100 according to an embodiment of the present invention. According to the present embodiment, the encoding device 100 comprises a sequence partitioning entity 101, an encoding entity set 102, a bitmapping entity 103, and a codeword processing entity 104. The sequence partitioning entity 101 is configured to divide an information bit sequence into L information bit sub-sequences. The information bit sequence consists of information bits that are encoded by the encoding device 100. The encoding entity set 102 comprises L encoding entities 102_0, 102_1, . . . , 102_L−1, L is an integer greater than or equal to 2. Each encoding entity 102_0, 102_1, . . . , 102_L−1 is configured to generate a respective encoded sub-sequence by encoding one information bit sub-sequence of the L information bit sub-sequences. Thus, each information bit sub-sequence is provided by the sequence partitioning entity 101 to one respective encoding entity 102_0, 102_1, . . . , 102_L−1.

According to a further embodiment, the information bit sequence has a predetermined length K, wherein K is an integer greater than or equal 1. According to the further embodiment, the sequence partitioning entity 101 is configured to divide the information bit sequence into L information bit sub-sequences such that each sub-sequence has a respective predetermined length. Furthermore, according to the further embodiment, each of the encoding entities 102_0, 102_1, . . . , 102_L−1 is configured to encode an information bit sub-sequence that has a respective predetermined length. Thus, each encoding entity 102_0, 102_1, . . . , 102_L−1 is associated with a respective predetermined information bit sub-sequence length. The sequence partitioning entity 101 provides each information bit sub-sequence of the L information bit sub-sequences to the respective encoding entity 102_0, 102_1, ..., 102_L−1 according to the length of the information bit sub-sequence. Each information bit sub-sequence is generated by the sequence partitioning entity 101 such that the information bit sub-sequence can be provided, in view of its length, to a respective one of the encoding entities 102_0, 102_1, ..., 102_L−1.

According to an embodiment, the encoded sub-sequences have the same length. Thus, regardless of the lengths of the L information bit sub-sequences, each of the encoded sub-sequences will have the same length. All of the encoding entities 102_0, 102_1, ..., 102_L−1 are configured to generate encoded sub-sequences that each have a predetermined encoded sub-sequence length.

According to the embodiment of FIG. 1, each encoding entity 102_0, 102_1, ..., 102_L−1 is configured to encode the respective information bit sub-sequence by use of a respective code rate. In other words, each encoding entity 102_0, 102_1, ..., 102_L−1 is associated with a respective code rate. The encoding entities 102_0, 102_1, ..., 102_L−1 are generally permitted to use different code rates. In one example, two or more encoding entities 102_0, 102_1, ..., 102_L−1 use different code rates, i.e. are associated with different code rates.

In the example of FIG. 1, the encoding device 100 is arranged as a multi-level encoder, in which the L encoding entities 102_0, 102_1, ..., 102_L−1 of the encoding entity set 102 are arranged in L levels, i.e. levels 0 to L−1. Each of the levels 0 to L−1 comprises, according to the present embodiment, one respective encoding entity 102_0, 102_1, ..., 102_L−1.

Moreover, any known encoding method for encoding an information bit sub-sequence may be implemented by means of the encoding entities 102_0, 102_1, ..., 102_L−1. The known encoding methods comprise, for example, methods for generating polar codes, methods for generating turbo codes, methods for generating low density parity check codes, wherein also further methods not explicitly listed here can be used.

The bitmapping entity 103 is configured to generate a codeword representing the information bit sequence by mapping one or more encoded bits of each of the encoded sub-sequences to a codeword symbol. For this purpose, the bitmapping entity 103 receives from each encoding entity 102_0, 102_1, ..., 102_L−1 a respective encoded sub-sequence and maps one or more encoded bits of the respective encoded sub-sequences to a symbol. The bitmapping 203 is executed by the bitmapping entity 103 such that each of the bits of each of the encoded sub-sequences is mapped to a symbol. The codeword, generated by the bitmapping 201, represents, thus, a sequence of symbols. The sequence partitioning entity 101, the encoding entity set 102, and the bitmapping entity 103 thus translate the information bit sequence into the codeword.

The codeword processing entity 104 is configured to generate an output codeword by processing the codeword from the bitmapping entity 103 for a non-orthogonal multiple access. Thus, the output codeword is generated such that it is configured for a transmission via a channel that is used concurrently for transmission purposes by a plurality of users or user devices respectively, i.e. by two or more users or user devices. In particular, the codeword processing entity 104 may be configured to process the codeword according to a non-orthogonal multiple access scheme (NOMA). The codeword processing entity 104 is, for example, configured to apply the scheme to orthogonal frequency-division multiplexing (OFDM).

Figure 2:
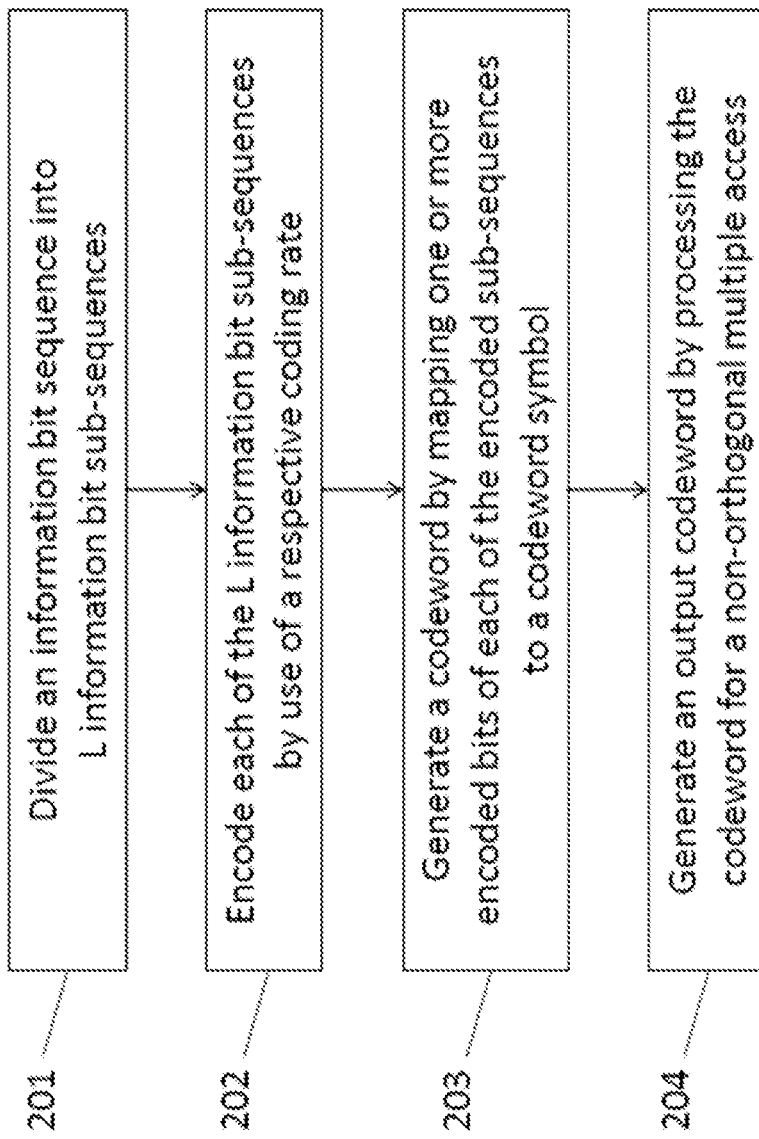
FIG. 2 shows a flow-diagram of an encoding method according to an embodiment of the present invention.

FIG. 2 shows a flow-diagram of an encoding method according to an embodiment of the present invention. The steps shown in FIG. 2 correspond, in general, the activities executed by the entities 101 to 104 of FIG. 1. Particularly, steps of the encoding method correspond to steps or activities executed by the encoding device 100. Thus, the encoding method comprises a step 201, in which an information bit sequence is divided into L information bit sub-sequences. The step 201 is executed as described with regard to the sequence partitioning entity 101. In particular, step 201 comprises at least one sub-step that corresponds to any one of the activities executed by the sequence partitioning entity 101. In step 202, each of the L information bit sub-sequences is encoded by use of a respective coding rate. The encoding 202 is executed as described with regard to the encoding entities 102_0, 102_1, ..., 102_L−1. In particular, step 202 comprises at least one sub-step that corresponds to any one of the activities executed by an encoding entity 102_0, 102_1, ..., 102_L−1. In step 203, a codeword is generated by mapping one or more encoded bits of each of the encoded sub-sequences to a codeword symbol. The generation 203 of the codeword is executed as described with regard to the bitmapping entity 103. In particular, step 203 comprises at least one sub-step that corresponds to any one of the activities executed by the bitmapping entity 103. In step 204, an output codeword is generated by processing the codeword for a non-orthogonal multiple access. The generation 204 of the output codeword is executed as described with regard to the codeword processing entity 104. In particular, step 204 comprises at least one sub-step that corresponds to any one of the activities executed by the codeword processing entity 104.

Figure 3:
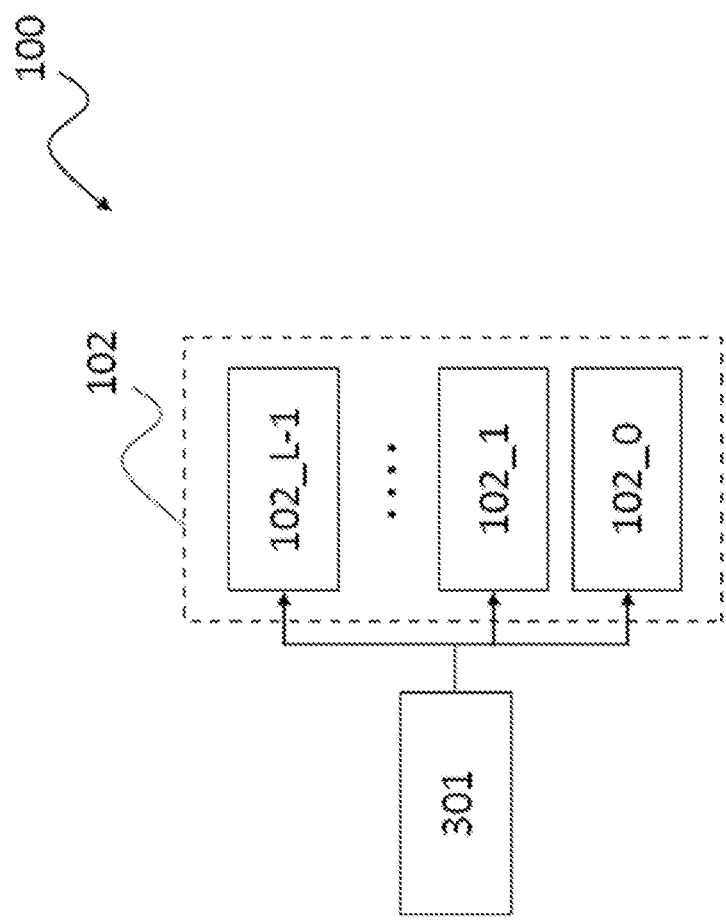
FIG. 3 shows a further exemplary arrangement of an encoding device according to an embodiment of the present invention.

FIG. 3 shows a further exemplary arrangement of an encoding device 100 according to an embodiment of the present invention. In particular, the encoding device 100 of FIG. 3 is arranged in the same way as shown in FIG. 1. However, according to the embodiment of FIG. 3, the encoding device 100 comprises additionally a code rate determining entity 301. The code rate determining entity 301 is configured to determine, for each, encoding entity 102_0, 102_1, ..., 102_L−1 a respective code rate, which the respective encoding entity 102_0, 102_1, ..., 102_L−1 uses for encoding information bit sub-sequences. The code rate determining entity 301 provides the determined code rates to the encoding entities 102_0, 102_1, ..., 102_L−1. Each of the encoding entities 102_0, 102_1, ..., 102_L−1 receives from the code rate determining entity 301 a respective code rate that has been computed or determined by the code rate determining entity 301 for the corresponding encoding entity 102_0, 102_1, ..., 102_L−1.

Figure 4:
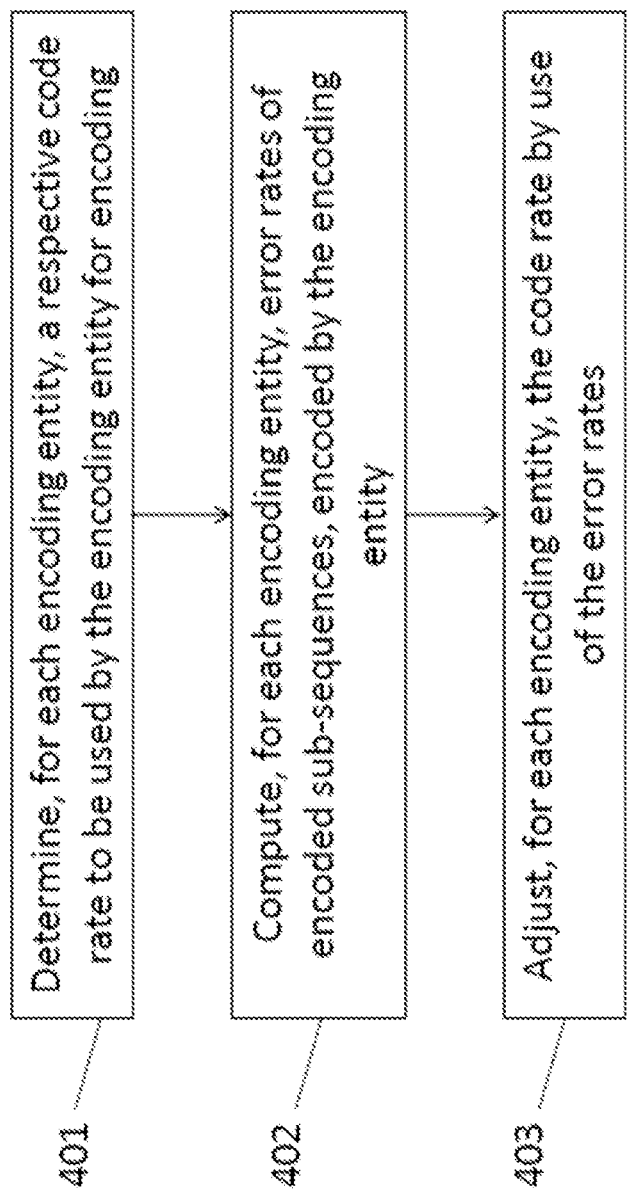
FIG. 4 shows a flow-diagram of steps, executed for determining code rates of the encoding entities, according to an embodiment of the present invention.

FIG. 4 shows a flow-diagram of steps, executed for determining code rates of the encoding entities, according to an embodiment of the present invention. The steps of FIG. 4 are executed by the encoding device 100. Particularly, said steps are executed by the code rate determining entity 301. Furthermore, according to further embodiments, one or more of the steps of FIG. 4 supplement the method of FIG. 1.

In step 401, for each encoding entity 102_0, 102_1, ..., 102_L−1, a respective code rate to be used by the corresponding encoding entity 102_0, 102_1, ..., 102_L−1 for encoding. According to the present embodiment, a code rate is determined for an encoding entity 102_0, 102_1, ..., 102_L−1 such that the code rate is equal to a capacity of a channel, which will be used for transmitting the output codeword to a further device. The channel is arranged such that more than two users or user devices (e.g., encoding devices) respectively transmit respective output codewords concurrently.

As generally known, channel capacity is the tight upper bound on the rate at which information (here, encoded output codeword(s)) can be reliably transmitted over a channel. By the noisy-channel coding theorem, the channel capacity of a given channel is the limiting information rate (e.g., in units of information per unit time) that can be achieved with arbitrarily small error probability.

The code rate (referred to also as information rate) is a proportion of the information bits in the codeword, i.e. a proportion that is useful (non-redundant). That is, if k information bits are encoded and the generated codeword has the length n, the code rate is k/n; for every k bits of useful information, an encoding entity generates totally n bits of data, of which n-k are redundant.

Thus, for each encoding entity $102\_0$, $102\_1$, ..., $102\_L-1$, a respective code rate to be used by the corresponding encoding entity $102\_0$, $102\_1$, ..., $102\_L-1$ for encoding, is defined as:

$$\frac{\text{length of the information bit subsequence}}{\text{length of the encoded subsequence}}$$

According to the present embodiment, the encoded sub-sequences, encoded by the encoding entities $102\_0$, $102\_1$, ..., $102\_L-1$, have the same length, i.e. the encoding entities $102\_0$, $102\_1$, ..., $102\_L-1$ generate encoded sub-sequences of the same length. Therefore, the determining 401 of the code rate, for each encoding entity $102\_0$, $102\_1$, ..., $102\_L-1$, is equivalent to determining the number of information bits of each encoded sub-sequence encoded by the respective encoding entity $102\_0$, $102\_1$, ..., $102\_L-1$, i.e. to determining the length of the information bit sub-sequence encoded by the respective encoding entity $102\_0$, $102\_1$, ..., $102\_L-1$.

The error rate of each encoding entity $102\_i$ of the encoding entity set 102 or the error rate at level i in the encoding entity set 102 respectively is equal to the capacity, $C^i$ of the equivalent channel experience at level i or of the encoding entity $102\_i$ respectively. Thus, the error rate of each encoding entity $102\_i$ or at level i, respectively, may be expressed by the following equation:

$$C^i = I(Y; X^i | X^0, \ldots, X^{i-1}),$$

where $I(Y; X^i, \ldots, X^{i-1})$ indicates the mutual information between the observation Y, and the symbols sent at level i, given the symbols sent at levels from 0 to i-1.

After the determination 401 of the respective code rate for each encoding entity $102\_0$, $102\_1$, ..., $102\_L-1$, in step 402, for each encoding entity $102\_0$, $102\_1$, ..., $102\_L-1$, respective error rates of the encoded sub-sequences, encoded by the respective encoding entity $102\_0$, $102\_1$, ..., $102\_L-1$, are computed.

Figure 5:
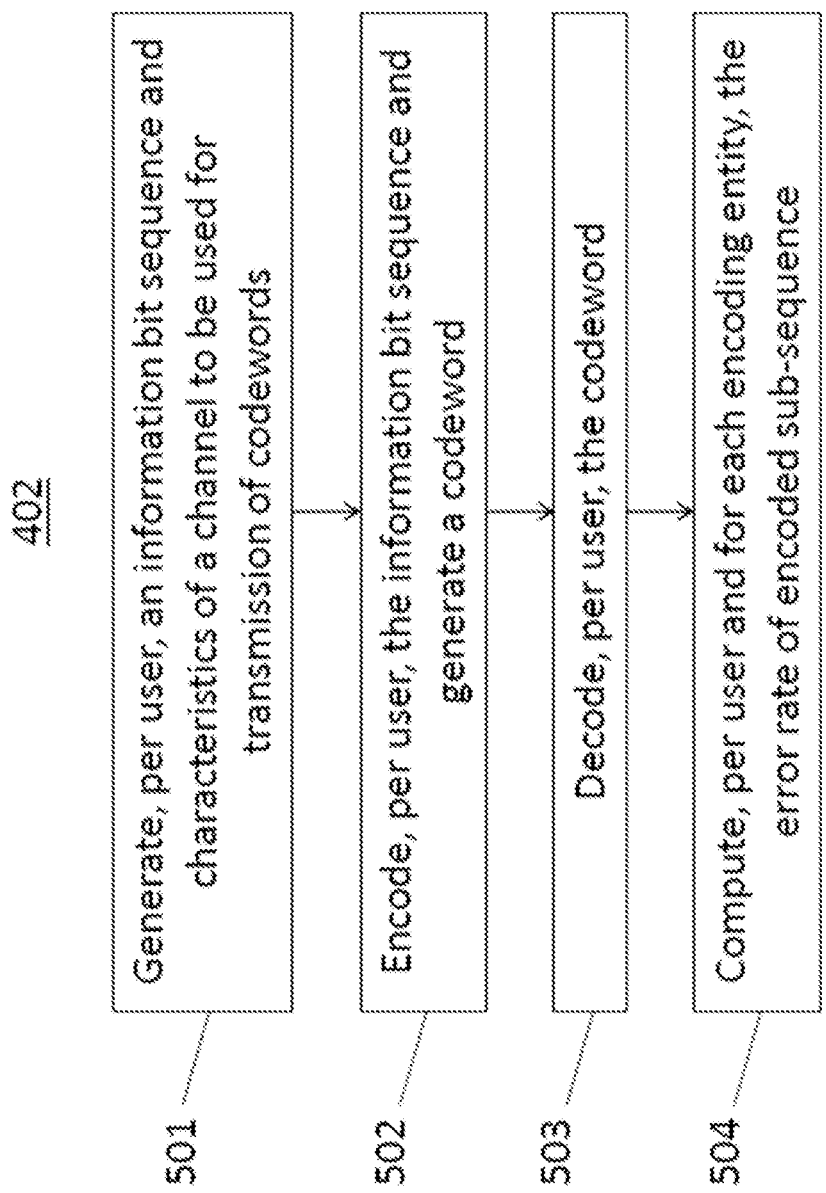
FIG. 5 shows a flow-diagram of sub-steps of a computation of a respective error rate of encoded sub-sequences, encoded by a particular encoding entity, according to an embodiment of the present invention.

According to the present embodiment, Monte-Carlo simulations are executed with regard to different channel realizations, wherein a pre-determined length of the encoded sub-sequences is used. Thus, all encoded sub-sequences, encoded by the encoding entities $102\_0$, $102\_1$, ..., $102\_L-1$, have the same pre-determined length in the Monte-Carlo simulations. Generally, a channel realization consists of a complex number per symbol. Two channel realizations differ from each other in the real and imaginary parts of the complex number. However, the coefficients of the complex numbers are drawn from a Gaussian distribution with zero mean and unitary variance. The implementation of Monte-Carlo simulations is generally known. Thus, the implementation according to the present embodiment is based on the known methods. FIG. 5 shows steps implemented to realize the Monte-Carlo simulations according to an embodiment of the present invention.

Particularly, FIG. 5 shows a flow-diagram of sub-steps of a computation of an error rate of encoded sub-sequences, encoded by a particular encoding entity $102\_0$, $102\_1$, ..., $102\_L-1$, according to an embodiment of the present invention. Thus, the steps of FIG. 5 show, how the error rate for one encoding entity $102\_0$, $102\_1$, ..., $102\_L-1$ of the L encoding entities $102\_0$, $102\_1$, ..., $102\_L-1$ of the set 102 is determined/computed.

Further, because the cannel is used concurrently by a plurality of users or user devices respectively, i.e. by two or more users or user devices, the steps of FIG. 5 are executed for each fictive user or user device of a fictive set of users or user devices. The fictive set of users or user devices is generated for executing simulations such that they reflect an assumed or expected use of the channel as realistic or close as possible. It is assumed that a particular number of users or user devices respectively will use the channel concurrently. Based on this assumed particular number, fictive users or user devices are generated as placeholders for real user or user devices in a respective fictive set.

In step 501, per user or user device respectively, an information bit sequence and characteristics of the channel to be used for the output codeword transmission are generated. The term "channel characteristics" is generally known. Channel characteristics comprise values of parameters of channel statistics. For example, the fading process is represented as a Gaussian complex random variable with 0 mean and the covariance equal to identity.

In step 502, per user or user device respectively, the information bit sequence is encoded by use of the respective/particular encoding entity $102\_0$, $102\_1$, ..., $102\_L-1$ and a codeword is generated by the bitmapping entity 103.

In step 503, per user or user device respectively, the codeword is decoded, and, in step 504, per user or user device respectively, the error rate of the encoded sub-sequence and, thus, of the respective/particular encoding entity $102\_0$, $102\_1$, ..., $102\_L-1$ is computed or determined respectively.

Thus, after the execution of the step 402, for each encoding entity $102\_0$, $102\_1$, ..., $102\_L-1$, a set of error rates is generated, wherein each error rate is determined with regard to one fictive user or user device of the fictive set of users or user devices.

In step 403, for each encoding entity $102\_0$, $102\_1$, ..., $102\_L-1$, the code rate of the encoding entity $102\_0$, $102\_1$, ..., $102\_L-1$ is adjusted by use of the error rates determined in step 402 for the respective encoding entity $102\_0$, $102\_1$, ..., $102\_L-1$. Additionally, also code rates of the further encoding entities $102\_0$, $102\_1$, ..., $102\_L-1$ are adjusted, if it has been determined that an adjustment of the error rate of the respective encoding entity $102\_0$, $102\_1$, ..., $102\_L-1$ is required. Exemplary sub-steps of the adjustment 403 of the error rates are shown in FIG. 6.

Figure 6:
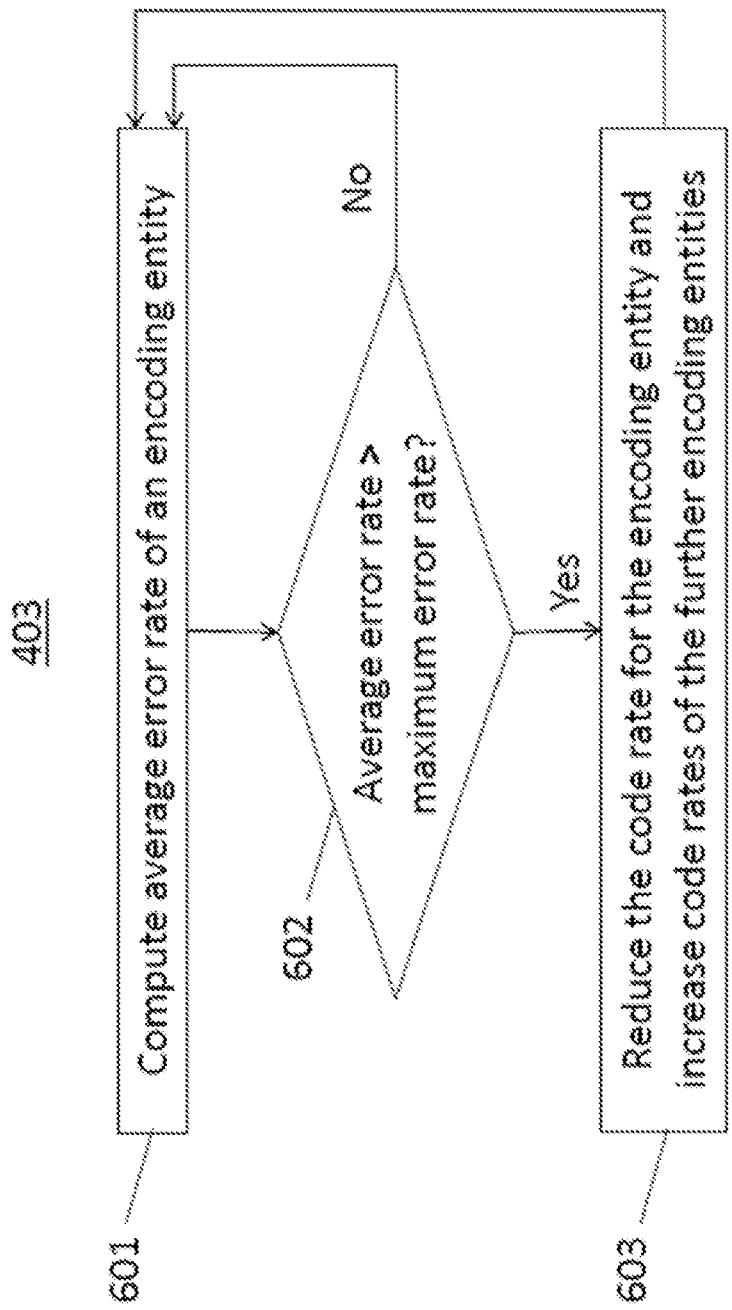
FIG. 6 shows a flow-diagram of sub-steps of an adjustment of code rates according to an embodiment of the present invention.

Particularly, FIG. 6 shows a flow-diagram of sub-steps of the adjustment 403 of code rates according to an embodiment of the present invention. The sub-steps of FIG. 6 are executed with regard to each encoding entity $102\_0$, $102\_1$, ..., $102\_L-1$ of the encoding entity set 102.

In step 601, for an encoding entity $102\_0$, $102\_1$, ..., $102\_L-1$, an average error rate is computed. The average error rate is computed as an average value of all error rates of the set of error rates generated in step 402 for the respective encoding entity 102_0, 102_1, ..., 102_L−1.

In step 602, the average error rate is compared with a maximum error rate. The maximum error rate represents a threshold. According to an embodiment, the maximum error rate is preset. Accordant to a further embodiment the maximum error rate is set to $10^{-2}$. If the average error rate is less than or equal to the maximum error rate, no adjustment of the code rate determined in step 401 is required. Thus, it is continued with the error rate adjustment for a next encoding entity 102_0, 102_1, ..., 102_L−1 of the encoding entity set 102. In FIG. 6, this is indicated by the arrow leading from the step 602 to the step 601. If all encoding entities 102_0, 102_1, ..., 102_L−1 of the encoding entity set 102 have been considered, i.e. if sub-steps (i.e. at least sub-steps 601 to 602) of FIG. 6 have been executed for all encoding entities 102_0, 102_1, ..., 102_L−1 of the encoding entity set 102, the execution of step 403 and, thus, also of the sub-steps of FIG. 6 is terminated.

If the average error rate is greater than the maximum error rate, an adjustment of the code rate determined in step 401 is required. Thus, it is continued with step 603. In step 603, the code rate, determined in step 401 for the respective encoding entity 102_0, 102_1, ..., 102_L−1, is reduced. According to an embodiment, the code rate is reduced by one bit at a time until the maximum error rate is achieved. Additionally, code rates of the further encoding entities 102_0, 102_1, ..., 102_L−1, determined in step 401, are adjusted. In particular, the code rates of the further encoding entities 102_0, 102_1, ..., 102_L−1 are increased. According to an embodiment, each code rate of the code rates of the further encoding entities 102_0, 102_1, ..., 102_L−1 is increased by one bit at a time as long as all levels satisfy the maximum error rate constraint, i.e. are smaller than the maximum error rate.

If all encoding entities 102_0, 102_1, ..., 102_L−1 of the encoding entity set 102 have been considered after the execution of the step 603, the execution of step 403 and, thus, also of the sub-steps of FIG. 6 is terminated. Otherwise, it is continued with the error rate adjustment for a next encoding entity 102_0, 102_1, ..., 102_L−1 of the encoding entity set 102. In FIG. 6, this is indicated by the arrow leading from the step 603 to the step 601.

When turning back to the code rate determining entity 301, as exemplary shown in FIG. 3, and FIG. 4, according to an embodiment, the code rate determining entity 301 determines the code rates of the encoding entities 102_0, 102_1, ..., 102_L−1 offline or in advance, respectively, i.e. before the encoding process is started by the encoding device 100. Thus, also the steps of FIG. 4 and, consequently, also of FIGS. 5 and 6 are executed offline or in advance, respectively. According to a further embodiment, the determination of the corresponding code rates is done offline or in advance for each channel, which can be used for the transmission of the output codewords. After the determination of the code rates, they are stored in a storage. When the encoding device 100 starts the encoding process, the respective code rates can be retrieved from the storage, for example, depending on the channel to be used. I.e. the code rates, which have been determined with regard to the respective channel, are retrieved. In this way, an efficient encoding process, which is adapted with regard to the channel to be used, is executed. If the determining of the code rates has been done offline or in advance, the retrieval of the code rates of the encoding entities 102_0, 102_1, ..., 102_L−1 and the provision of the code rates of the encoding entities 102_0, 102_1, ..., 102_L−1 can be done by the code rate determining entity 301 and/or by a further processing entity of the encoding device 100.

For further explanation of the encoding process, it is turned back to FIG. 1 and FIG. 2 and, particularly, to the bitmapping entity 103 and to the step 203. In the following, an exemplary operation of the bitmapping entity 103 and an exemplary execution of the step 203 is described.

Once all encoding entities 102_0, 102_1, ..., 102_L−1 have generated the encoded sub-sequences by use of the respective code rates, the encoded sub-sequences are considered, according to an embodiment, in parallel. The parallel consideration is possible because the encoded sub-sequences have the same length, e.g., a predetermined length.

When bitmapping 203 is executed by a parallel consideration of the encoded sub-sequences, among all encoded sub-sequences, i-th bits of all encoded sub-sequences are considered in parallel, wherein i is an integer that is greater than or equal to zero and that is smaller than the length of the encoded sub-sequences.

All i-th bits of all encoded sub-sequences are mapped 203 to a symbol. This mapping is done for each i-th bit.

Figure 7:
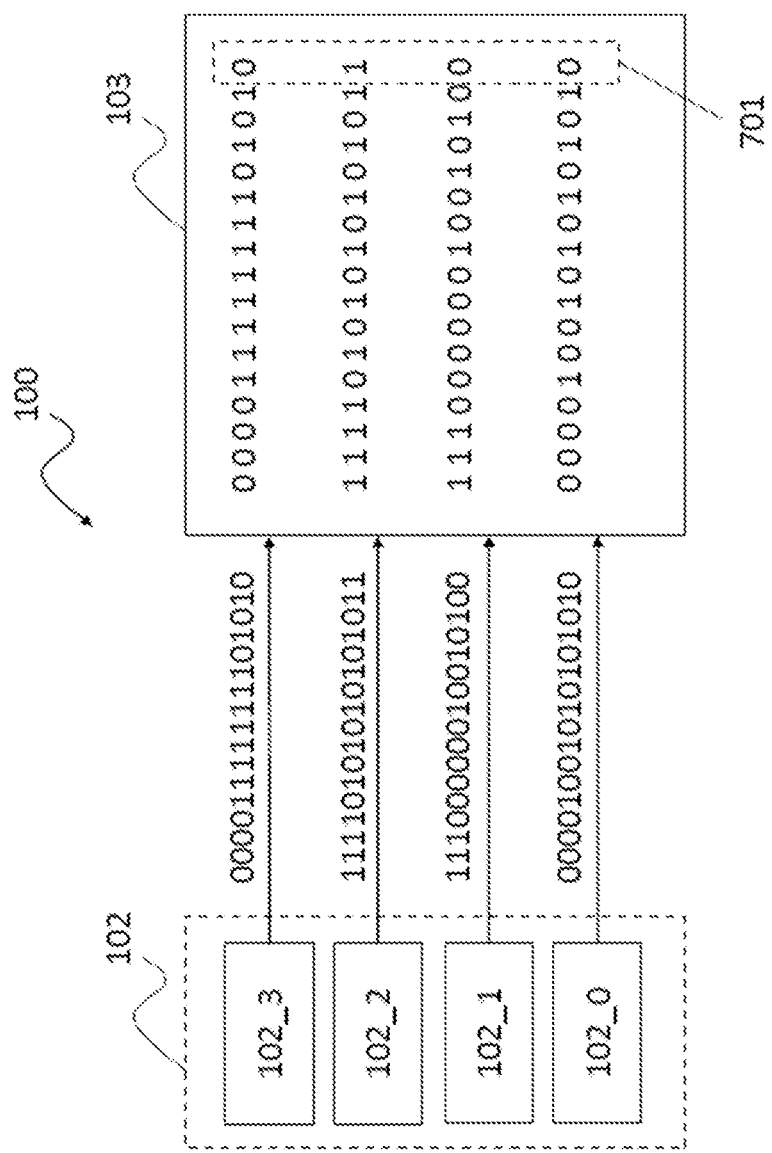
FIG. 7 shows an exemplary execution of bitmapping according to an embodiment of the present invention.

FIG. 7 shows an exemplary execution of bitmapping according to an embodiment of the present invention. In the embodiment of FIG. 7, four encoding entities 102_0 to 102_3 are provided exemplary in the encoding entity set 102, wherein embodiments of the present invention are not limited to four encoding entities and any number of encoding entities that is larger than two can be used. Each of the encoding entities 102_0 to 102_3 generates an encoded sub-sequence, wherein all sub-sequences have the same length, and provides the respective encoded sub-sequence to the bitmapping entity 103. In the bitmapping entity 103, the bitmapping 203 of the encoded sub-sequences is executed. For this purpose, all i-th bits of all encoded sub-sequences are considered in parallel. It is started with the 0-th bit and continued until the last bit of the encoded sub-sequences has been processed. This is visualized in FIG. 7 by box 701, which exemplary indicates the step, in which, in all encoded sub-sequences, the respective 0-th bit is considered. The 0-th bits are mapped to a symbol. According to an embodiment, the symbols, to which i-th bits are mapped, are complex values.

When considering the encoding device 100 as a multi-level encoding device, each of the encoding entities 102_0 to 102_3 constitutes an encoding level. Thus, encoding entity 102_0 constitutes level 0, encoding entity 102_1 constitutes level 1, encoding entity 102_2 constitutes level 2, and encoding entity 102_3 constitutes level 3.

According to an embodiment, i-th bits of the encoding entities 102_0 to 102_3 are mapped to a complex value belonging to a quadrature amplitude modulation (QAM) constellation of size M, where $M=2^L$.

The sequence of the generated 203 symbols represents the output codeword.

Figure 8:
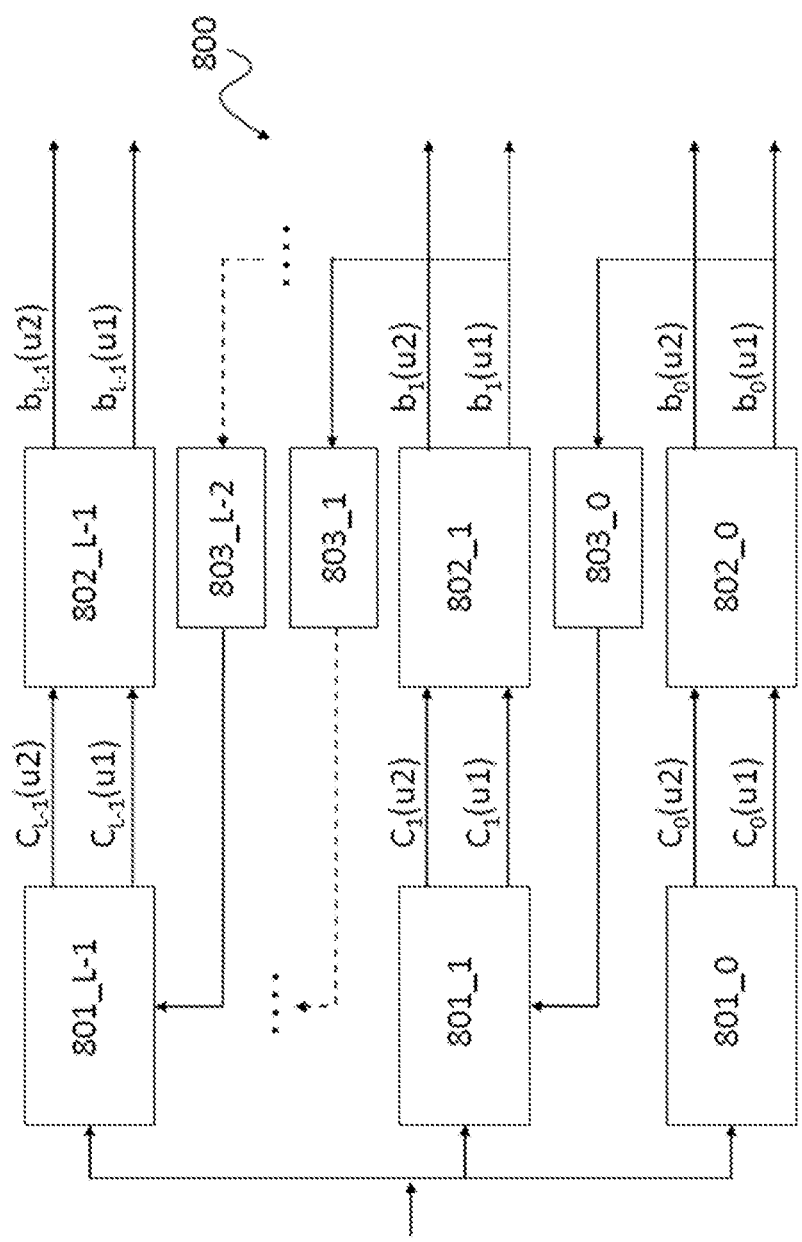
FIG. 8 shows an exemplary arrangement of a decoding device according to an embodiment of the present invention.

FIG. 8 shows an exemplary arrangement of a decoding device 800 according to an embodiment of the present invention. The decoding device 800 is configured to decode output codewords transmitted from two or more users or user devices, respectively, via the same channel, wherein each user device of the two or more user devices transmits respective output codewords via the channel concurrently. Each of the output codewords is generated, as explained above with regard to the encoding device 100 and the corresponding encoding method. Thus, each of the output codewords comprises a sequence of symbols, wherein each of the symbols represents bits, as explained above with regard to the encoding device 100 and the corresponding encoding method.

According to the present embodiment, the decoding device 800 comprises a multi-user detecting entity set, which comprises L multi-user detecting entities 801_0, 801_1, . . . , 801_L−1, a decoding entity set, which comprises L decoding entities 802_0, 802_1, . . . , 802_L−1, and an encoding entity set. The encoding entity set comprises L−1 encoding entities 803_0, 803_1, . . . , 803_L−2.

The decoding device 800 is a multi-level decoding device comprising L levels, wherein each level of the decoding device 800 comprises one multi-user detecting entity 801_0, 801_1, . . . , 801_L−1 of the multi-user detecting entity set and one decoding entity 802_0, 802_1, . . . , 802_L−1 of the decoding entity set. Between two levels of the decoding device 800 an encoding entity 803_0, 803_1, . . . , 803_L−2 of the encoding entity set is located.

Each multi-user detecting entity 801_0, 801_1, . . . , 801_L−1 is configured, for each user device of the two or more user devices, to detect an encoded bit sequence from an output codeword transmitted from the respective user device via the channel.

Additionally, according to the present embodiment, each multi-user detecting entity 801_0, 801_1, . . . , 801_L−1 of level 'i' is configured to determine, for each i-th bit of each symbol of symbols of the output codeword of the respective user device, a log likelihood ratio and to add the log likelihood ratio of the respective i-th bit to a log likelihood ratio set. Because the output codewords have been encoded by L encoding entities 102_0, 102_1, . . . , 102_L−1, as described above, each of the output codewords comprises symbols that represent L bits. I.e. each of the symbols represents L bits, as described above with regard to the encoding entity 100 and the corresponding method. Thus, by computing in each level 'i' the log likelihood ratios of the respective i-th bits of the symbols, in the last level the log likelihood ratios will be determined for each of the bits.

The log likelihood ratio set comprises entries on already determined log likelihood ratios, wherein each entry comprises a determined log likelihood ratio, an indication to the user, with regard to which the log likelihood ratio has been determined, an indication to the symbol of the output codeword, with regard to which the log likelihood ratio has been determined, and an indication to the i-th bit, with regard to which the log likelihood ratio has been determined.

According to an embodiment, each of the log likelihood ratios is computed for the i-th bit of a particular symbol by applying a message passing algorithm (MPA) and by considering the distance between the observation and a set of constellation symbols that are associated to the bit value (0 or 1). At the initial stage, for a 16 QAM constellation, for example, there are 8 constellation symbols corresponding to bit 0 and 8 symbols corresponding to bit 1. This applies to each symbol of each user device.

Further, each multi-user detecting entity 801_0, 801_1, . . . , 801_L−1 is configured to provide the encoded bit sequence to a decoding entity 802_0, 802_1, . . . , 802_L−1 of the decoding entity set, which is in the same level as the multi-user detecting entity. Additionally, according to an embodiment, each multi-user detecting entity 801_0, 801_1, . . . , 801_L−1 is configured to provide also the log likelihood ratio set to said decoding entity 802_0, 802_1, . . . , 802_L−1 of the decoding entity set.

Each decoding entity 802_0, 802_1, . . . , 802_L−1 of the decoding entity set is configured to generate, for each user device, a decoded information bit sequence by decoding the encoded bit sequence of the respective user device. According to the present embodiment, each decoding entity 802_0, 802_1, . . . , 802_L−1 is configured to execute the decoding by the log likelihood ratio set. The decoding comprises a comparison of the log likelihood ratios of the log likelihood ratio set. Here, if a log likelihood ratio for an i-th bit is greater than or equal to 0 then the decided bit i is set to 1, otherwise the i-th bit is set to 0.

Further, if considering the encoding device 100 as a multi-level encoding device, in which each of the encoding entities 102_0, 102_1, . . . , 102_L−1 are arranged in L levels, each level comprising one of the encoding entities 102_0, 102_1, . . . , 102_L−1, each decoding entity 802_0, 802_1, . . . , 802_L−1 of a level 'i' is an inverse of the encoding entity 102_0, 102_1, . . . , 102_L−1 of the level 'i'. I.e. each decoding entity 802_0, 802_1, . . . , 802_L−1 of a level 'i' provides decoded information bits that have been encoded by the encoding entity 102_0, 102_1, . . . , 102_L−1 of the level 'i'.

Each encoding entity 803_0, 803_1, . . . , 803_L−2 of the encoding entity set is configured, for each user device of the two or more user devices, to receive from a decoding entity 802_0, 802_1, . . . , 802_L−1 of the decoding entity set the decoded information bit sequence of the respective user device, to generate an encoded information bit sequence from the decoded information bit sequence, and to provide the encoded information bit sequence to a multi user detecting entity 801_0, 801_1, . . . , 801_L−1 of the multi-user detecting entity set. The level of the multi-user detecting entity 801_0, 801_1, . . . , 801_L−1, to which the respective encoding entity 803_0, 803_1, . . . , 803_L−2 provides the encoded information bit sequence, is a subsequent level of the level of the decoding entity 802_0, 802_1, . . . , 802_L−1, from which the respective encoding entity 803_0, 803_1, . . . , 803_L−2 received the decoded information bit sequence.

In view of the aforesaid, in FIG. 8, the level 0 of the decoding device 800 comprises the multi-user detecting entity 801_0 and the decoding entity 802_0, the level 1 of the decoding device 800 comprises the multi-user detecting entity 801_1 and the decoding entity 802_1, the level i of the decoding device 800 comprises the multi-user detecting entity 801_i (not shown) and the decoding entity 802_i (not shown), wherein i is larger than or equal to 0 and is smaller than L, and the level L−1 of the decoding device 800 comprises the multi-user detecting entity 801_L−1 and the decoding entity 802_L−1. Between each of two levels of the decoding device 800, an encoding entity 803_0, 803_1, . . . , 803_L−2 is located. Each encoding entity 803_0, 803_1, . . . , 803_L−2 is connected to a decoding entity 802_0, 802_1, . . . , 802_L−1 of one level and to a multi-user detecting entity 801_0, 801_1, . . . , 801_L−1 of a further level that is the subsequent level of the level of said decoding entity 802_0, 802_1, . . . , 802_L−1.

In level 0, the multi-user detecting entity 801_0 receives output codewords of two or more user devices u1, u2, which transmit respective output codewords via the same channel concurrently. Each output codeword comprises a sequence of symbols, as explained above with regard to the encoding device 100 and the corresponding encoding method. According to an embodiment, the symbols are complex values. Each of the symbols of an output codeword represents L bits, because the output codeword has been generated by L encoding entities 102_0, 102_1, . . . , 102_L−1 of an encoding device 100, as explained above.

Further, the multi-user detecting entity 801_0 detects, for each user device u1, u2, the encoded bit sequence $C_0(u1)$, $C_0(u2)$ from the output codeword that has been transmitted by the user device u1, u2.

Additionally, according to the present embodiment, the multi-user detecting entity 801_0 determines, for each 0-th bit of each of symbols of each output codeword of the output codewords of users u1, u2, a log likelihood ratio and adds the respective log likelihood ratio of the 0-th bit to a log likelihood ratio set, as explained above. As mentioned, according to an embodiment, each of the log likelihood ratios is computed by applying a message passing algorithm (MPA) and by considering the distance between the observation and a set of constellation symbols that are associated to the bit value (0 or 1).

The multi-user detecting entity 801_0 provides the determined encoded bit sequences $C_0(u1)$, $C_0(u2)$ of the two or more user devices u1, u2 to the decoding entity 802_0, which is in the same level 0 as the multi-user detecting entity 801_0. Additionally, the multi-user detecting entity 801_0 provides the log likelihood ratio set to the decoding entity 802_0.

The decoding entity 802_0 decodes each of the encoded bit sequences $C_0(u1)$, $C_0(u2)$ of the two or more user devices u1, u2, and generates, thus, corresponding decoded information bit sequences $b_0(u1)$, $b_0(u2)$. Further, the decoding entity 802_0 outputs the corresponding decoded information bit sequences $b_0(u1)$, $b_0(u2)$ of the two or more user devices u1, u2. According to the present embodiment, the decoding entity 802_0 decodes each of the encoded bit sequences $C_0(u1)$, $C_0(u2)$ of the two or more user devices u1, u2 by use of the log likelihood ratio set.

The decoded information bit sequences $b_0(u1)$, $b_0(u2)$ of the two or more user devices u1, u2 can be used for further processing, as shown by the arrows that do not lead to the encoding entity 803_0.

Further, the decoded information bit sequences $b_0(u1)$, $b_0(u2)$ of the two or more user devices u1, u2 are provided to the encoding entity 803_0 that is located in the decoding device 800 between the level 0 and the level 1. The encoding entity 803_0 encodes each of the decoded information bit sequences $b_0(u1)$, $b_0(u2)$ of the two or more user devices u1, u2, and provides the corresponding resulting encoded information bit sequences to the multi-user detecting entity 801_1 of the subsequent level, i.e. level 1 of the decoding device 800.

In level 1, also the multi-user detecting entity 801_1 receives the output codewords of two or more user devices u1, u2. The multi-user detecting entity 801_1 detects, for each user device u1, u2, the encoded bit sequence $C_1(u1)$, $C_1(u2)$ from the output codeword that has been transmitted by the user device u1, u2.

Additionally, according to the present embodiment, the multi-user detecting entity 801_1 determines, for each 1st bit of each of symbols of each output codeword of the output codewords of users u1, u2, a log likelihood ratio and adds the respective log likelihood ratio of the 1st bit to a log likelihood ratio set, as explained above. In comparison to the multi-user detecting entity 801_0, the multi-user detecting entity 801_1 has received encoded information bit sequences generated by the encoding entity 803_0 and has knowledge on previously determined log likelihood ratios. The multi-user detecting entity 801_1 takes into consideration the encoded information bit sequences received from the encoding entity 803_0 and the log likelihood ratio set with the previously determined log likelihood ratios when computing for each 1st bit of each of the symbols the respective log likelihood ratio. As stated above, according to an embodiment, the multi-user detecting entity 801_1 computes the log likelihood ratios by use of the message passing algorithm. In particular, the distance between the observation and a reduced set of symbols is considered when computing the log likelihood ratios.

The multi-user detecting entity 801_1 provides the determined encoded bit sequences $C_1(u1)$, $C_1(u2)$ of the two or more user devices u1, u2 to the decoding entity 802_1, which is in the same level 1 as the multi-user detecting entity 801_1. Additionally, the multi-user detecting entity 801_1 provides the log likelihood ratio set to the decoding entity 802_1.

The decoding entity 802_1 decodes each of the encoded bit sequences $C_1(u1)$, $C_1(u2)$ of the two or more user devices u1, u2, and generates, thus, corresponding decoded information bit sequences $b_1(u1)$, $b_1(u2)$. Further, the decoding entity 802_1 outputs the corresponding decoded information bit sequences $b_1(u1)$, $b_1(u2)$ of the two or more user devices u1, u2. According to the present embodiment, the decoding entity 802_1 decodes each of the encoded bit sequences $C_1(u1)$, $C_1(u2)$ of the two or more user devices u1, u2 by use of the log likelihood ratio set.

The decoded information bit sequences $b_1(u1)$, $b_1(u2)$ of the two or more user devices u1, u2 can be used for further processing, as shown by the arrows that do not lead to the encoding entity 803_1.

Further, the decoded information bit sequences $b_1(u1)$, $b_1(u2)$ of the two or more user devices u1, u2 are provided to the encoding entity 803_1 that is located in the decoding device 800 between the level 1 and the level 2. The encoding entity 803_1 encodes each of the decoded information bit sequences $b_1(u1)$, $b_1(u2)$ of the two or more user devices u1, u2, and provides the corresponding resulting encoded information bit sequences to the multi-user detecting entity 801_2 of the subsequent level, i.e. level 2 of the decoding device 800.

The further multi-user detecting entities, the further decoding entities, and the further encoding entities of the further levels of the decoding device 800 operate in the same way as the multi-user detecting entity 801_1, the decoding entity 802_1, and the encoding entity 803_1.

In the following, an example for decoding output codewords, transmitted concurrently by three user devices via the same channel, is presented to explain the calculation of the log likelihood ratios in more detail. For this purpose, the following two equations are presented and considered:

$$p(b(u3)=0) = \sum_{(b(u1),b(u2))} p(b(u1))p(b(u2)) \qquad \text{Equation (1)}$$

$$\sum_{x \in S(b_l=0|b_{l-1}=c_{l-1},\ldots,b_0=c_0)} \frac{1}{\sqrt{2\pi}\,\sigma} e^{-\left\|\frac{y(t)-f(x,x(b(u1)),x(b(u2)))}{2\sigma^2}\right\|^2}$$

-continued $$p(b(u3) = 1) = \sum_{(b(u1),b(u2))} p(b(u1))p(b(u2)) \sum_{x \in S(b_l=1|b_{l-1}=c_{l-1},\ldots,b_0=c_0)} \frac{1}{\sqrt{2\pi}\sigma} e^{-\left\|\frac{y(t)-f(x,x(b(u1)),x(b(u2)))}{2\sigma^2}\right\|^2}$$

Equation (2)

Equation (1) expresses the probability that the 3rd user transmitted a bit equal to 0 at time t and at level 1, given all the bits decided from level 0 to 1-1 for user 3 (which can be either 0 or 1). Marginalization is applied for the symbols sent by the interfering users.

Equation (2) represents the probability that user 3 transmitted a 1 at level 1, given that cl-1 was decided at the previous decoding stage. The LLR for this symbol time is the logarithm of the ratio between Eq. (1) and Eq. (2).

(b(u1),b(u2)) corresponds to all the possible combinations of the bits for the interfering users. These combinations are (0,0), (1,0), (0,1), (1,1).

The symbol x represents instead the set of symbols in the constellation that correspond to hypothesis 0 for equation (1) and 1 for equation (2) for the bit at level 1, given all the bits decoded for user u3 until level 1-1. Y is the observation. f( ) is a function of the symbols x and the symbols corresponding to users u1 and u2. P(b(u1)) is the a priori probability for bits of user u1.

Figure 9:
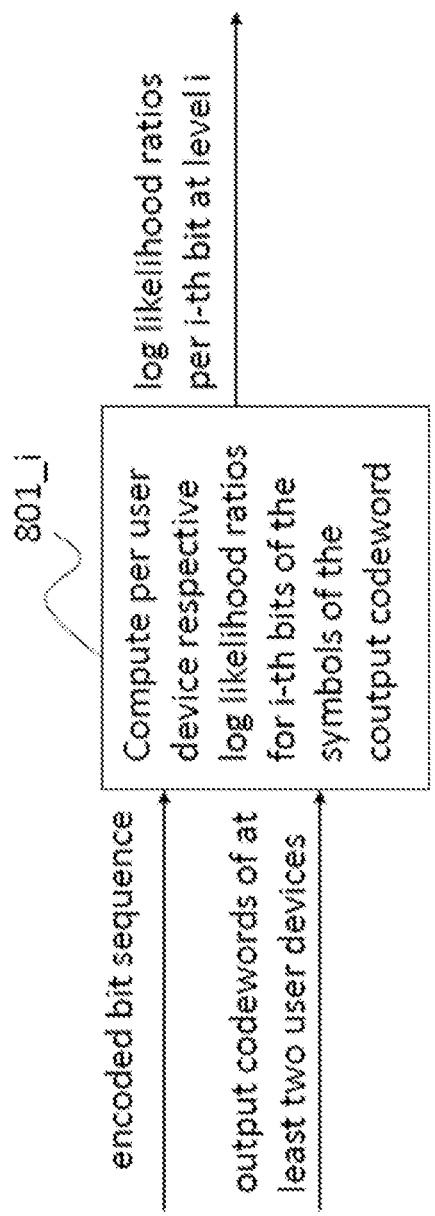
FIG. 9 shows a calculation of log likelihood ratios at the i-th level by a multi-user detecting entity according to an embodiment of the present invention.

In view of the aforesaid, the log likelihood ratios are determined as shown in FIG. 9. Particularly, FIG. 9 shows a calculation of the log likelihood ratios in an i-th level by the multi-user detecting entity 801_*i* according to an embodiment of the present invention. According to the embodiment of FIG. 9, the multi-user detecting entity 801_*i* receives, for each user device u1, u2 of two or more user devices u1, u2, an encoded bit sequence from encoding entity 803_0, 803_1, ..., 803_L−2 and output codewords. The multi-user detecting entity 801_*i* determines log likelihood ratios of i-th bits of each of the symbols of each output codeword of the received output codewords by use of the equations (1) and (2). Each of the determined log likelihood ratios is added to the log likelihood ratio set. After the determination of all log likelihood ratios, the log likelihood ratio set is provided such that it comprises also the log likelihood ratios for the i-th level.

Thus, embodiments of the present invention are directed to encoding of information bit sequences by use of an encoding device having more than two encoding entities and to decoding of output codewords by a decoding device having more than two decoding entities. The encoding and the decoding are executed in view of the fact that output codewords, generated by the encoding device, are transmitted to the decoding device via a channel, via which two or more user devices transmit the respective output codewords concurrently.

Embodiments of the invention have been described in conjunction with various examples herein. However, other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. An encoding device arranged for encoding an information bit sequence, the encoding device comprising a non-transitory computer readable medium having program code stored thereon that, when executed, causes the encoding device to perform a method comprising:
   dividing, by a sequence partitioning entity, the information bit sequence into L information bit sub-sequences, wherein L is an integer greater than or equal to two;
   generating, by each encoding entity of an encoding entity set comprising L encoding entities, a respective encoded sub-sequence by encoding one information bit sub-sequence of the L information bit sub-sequences, wherein each encoding entity of the encoding entity set encodes the respective information bit sub-sequence using a respective code rate, which is determined for transmission via a channel, wherein more than two devices execute transmissions concurrently via the channel;
   generating, by a bitmapping entity, a codeword by mapping one or more encoded bits of each of the encoded sub-sequences to a codeword symbol;
   generating, by a codeword processing entity, an output codeword by processing the codeword for a non-orthogonal multiple access;
   determining, by a code rate determining entity, for each encoding entity of the encoding entity set, the respective code rate to be used by a corresponding encoding entity for encoding;
   computing, by the code rate determining entity, for each encoding entity, error rates of encoded sub-sequences, encoded by the corresponding encoding entity; and
   adjusting by the code rate determining entity for each encoding entity the respective code rate to be used by the corresponding encoding entity for encoding, using the error rates.

2. The encoding device according to claim 1, wherein the method further comprises processing the codeword according to a non-orthogonal multiple access scheme.

3. The encoding device according to claim 1, wherein the method further comprises transmitting the output codeword to a further device via the channel, and wherein more than two devices transmit respective output codewords via the channel concurrently.

4. The encoding device according to claim 1, wherein the method further comprises encoding an information bit sub-sequence that has a predetermined length.

5. The encoding device according to claim 1, wherein the information bit sequence is divided such that each information bit sub-sequence has a respective predetermined length.

6. The encoding device according to claim 1, wherein two or more encoding entities of the encoding entity set use different code rates.

7. The encoding device according to claim 1, wherein, for each encoding entity, error rates are computed using Monte-Carlo simulations.

8. The encoding device according to claim 1, wherein, for each encoding entity, the code rate is adjusted using the error rates by:
  computing an average error rate from the error rates of encoded sub-sequences, encoded by the corresponding encoding entity; and
  when the average error rate is greater than a maximum error rate, adjusting the code rate.

9. The encoding device according to claim 1, wherein the encoded sub-sequences have a same length.

10. An encoding method for encoding an information bit sequence, the encoding method comprising:
  dividing, by a sequence partitioning entity, the information bit sequence into L information bit sub-sequences, wherein L is an integer greater than or equal to two;
  encoding the L information bit sub-sequences, by an encoding entity set, wherein the encoding entity set comprises L encoding entities;
  encoding one information bit sub-sequence of the L information bit sub-sequences, by each encoding entity of the encoding entity set, to generate a respective encoded sub-sequence; and
  encoding a respective information bit sub-sequence, by each encoding entity of the encoding entity set, using a respective code rate, which is determined for transmission via a channel, wherein more than two devices execute transmissions concurrently via the channel;
  generating, by a bitmapping entity, a codeword by mapping one or more encoded bits of each of the encoded sub-sequences to a codeword symbol;
  generating, by a codeword processing entity, an output codeword by processing the codeword for a non-orthogonal multiple access;
  determining, by a code rate determining entity, for each encoding entity of the encoding entity set, the respective code rate to be used by a corresponding encoding entity for encoding;
  computing, by the code rate determining entity, for each encoding entity, error rates of encoded sub-sequences encoded by the corresponding encoding entity; and
  adjusting, by the code rate determining entity, for each encoding entity, the respective code rate to be used by the corresponding encoding entity for encoding using the error rates.

11. A decoding device arranged to decode output codewords received from two or more user devices via a channel, wherein each user device of the two or more user devices transmits respective output codewords via the channel concurrently, wherein the decoding device comprises:
  a multi-user detecting entity set comprising L multi-user detecting entities, wherein L is an integer greater than or equal to two; and
  a decoding entity set comprising L decoding entities,
  wherein the decoding device is a multi-level decoding device comprising L levels, wherein each level of the L levels comprises one multi-user detecting entity of the multi-user detecting entity set and one decoding entity of the decoding entity set,
  wherein an encoding entity of an encoding entity set is located between two levels of the decoding device, and
  wherein, for each user device of the two or more user devices concurrently transmitting the respective output codewords via the channel, each multi-user detecting entity of the multi-user detecting entity set is configured to:
    detect an encoded bit sequence from an output codeword transmitted from a respective user device via the channel wherein the output codeword comprises a plurality of symbols;
    for an i-th bit of each of the plurality of symbols of the output codeword, determine a log likelihood ratio and add the log likelihood ratio of the i-th bit to a log likelihood ratio set, wherein i corresponds to a level where the multi-user detecting entity is located; and
    provide the encoded bit sequence and the log likelihood ratio set to a decoding entity of the decoding entity set, which is in a same level as the multi-user detecting entity,
  wherein each decoding entity of the decoding entity set is configured to generate, for each user device of the two or more user devices, a decoded information bit sequence by decoding the encoded bit sequence of the respective user device, by using the log likelihood ratio set, and
  wherein, for each user device of the two or more user devices, each encoding entity of the encoding entity set is configured to:
    receive from a decoding entity of the decoding entity set the decoded information bit sequence of the respective user device;
    generate an encoded information bit sequence from the decoded information bit sequence; and
    provide the encoded information bit sequence to a multi-user detecting entity of the multi-user detecting entity set, wherein the level of the multi-user detecting entity is a subsequent level of the level of the decoding entity.

12. A non-transitory computer-readable medium having program code stored thereon that, when executed, causes a computer to perform a method comprising:
  dividing, by a sequence partitioning entity, the information bit sequence into L information bit sub-sequences, wherein L is an integer greater than or equal to two;
  generating, by each encoding entity of an encoding entity set comprising L encoding entities, a respective encoded sub-sequence by encoding one information bit sub-sequence of the L information bit sub-sequences, wherein each encoding entity of the encoding entity set encodes the respective information bit sub-sequence using a respective code rate, which is determined for transmission via a channel, wherein more than two devices execute transmissions concurrently via the channel;
  generating, by a bitmapping entity, a codeword by mapping one or more encoded bits of each of the encoded sub-sequences to a codeword symbol;
  generating, by a codeword processing entity, an output codeword by processing the codeword for a non-orthogonal multiple access;
  determining, by a code rate determining entity, for each encoding entity of the encoding entity set, the respective code rate to be used by a corresponding encoding entity for encoding;
  computing, by the code rate determining entity, for each encoding entity, error rates of encoded sub-sequences, encoded by the corresponding encoding entity; and
  adjusting, by the code rate determining entity, for each encoding entity, the respective code rate to be used by the corresponding encoding entity for encoding, using the error rates.

13. The encoding method according to claim 10, further comprising processing the codeword according to a non-orthogonal multiple access scheme.

14. The encoding method according to claim 10, further comprising transmitting the output codeword to a further device via the channel, wherein more than two devices transmit respective output codewords via the channel concurrently.

15. The encoding method according to claim 10, further comprising encoding an information bit sub-sequence that has a predetermined length.

16. The encoding method according to claim 10, wherein the information bit sequence is divided such that each information bit sub-sequence has a respective predetermined length.

17. The encoding method according to claim 10, wherein two or more encoding entities of the encoding entity set use different code rates.

18. The encoding method according to claim 10, wherein, for each encoding entity, error rates are computed using Monte-Carlo simulations.

19. The encoding method according to claim 10, wherein, for each encoding entity, the code rate is adjusted using the error rates by:
   computing an average error rate from the error rates of encoded sub-sequences encoded by the corresponding encoding entity; and
   when the average error rate is greater than a maximum error rate, adjusting the code rate.

* * * * *